June 17, 1930.　　J. F. MAHLSTEDT　　1,764,802
EGG INSPECTION APPARATUS
Filed Aug. 21, 1928　　2 Sheets-Sheet 1
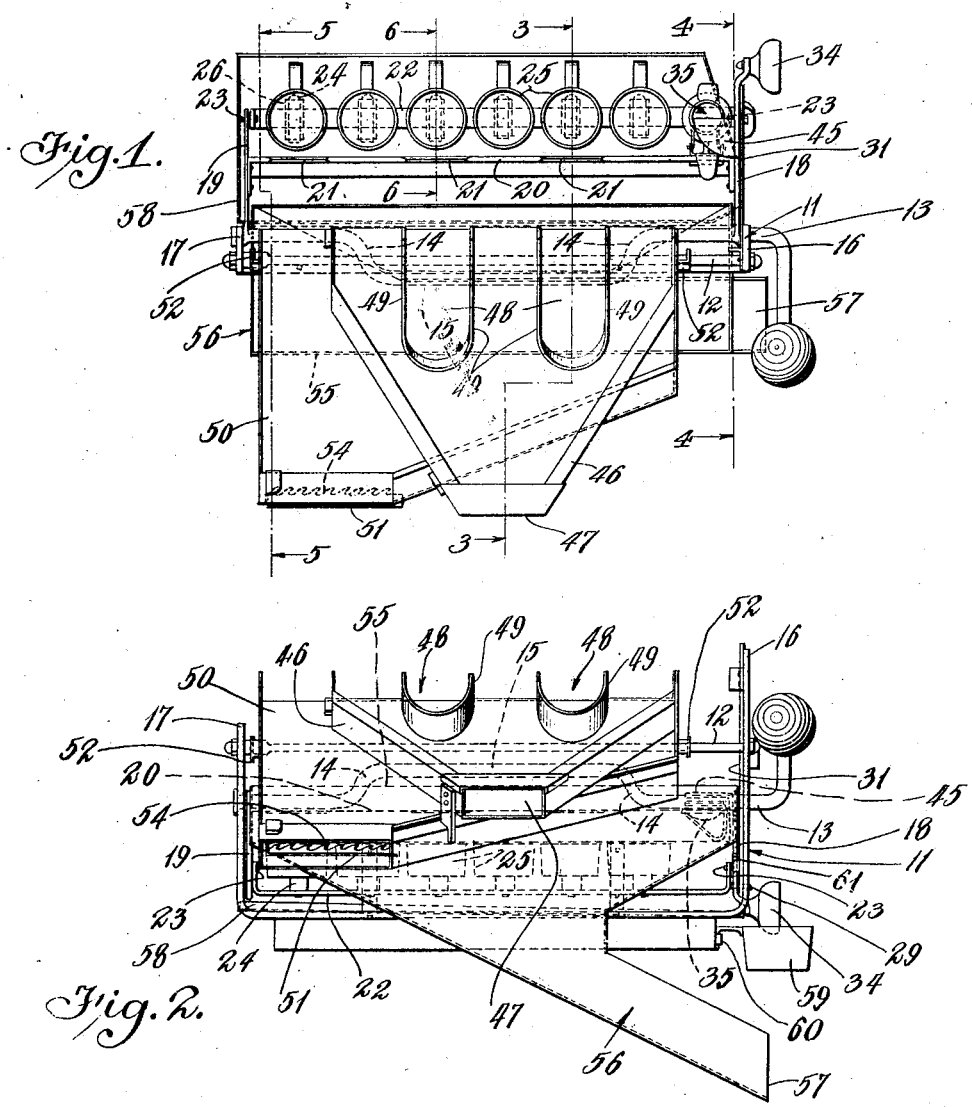
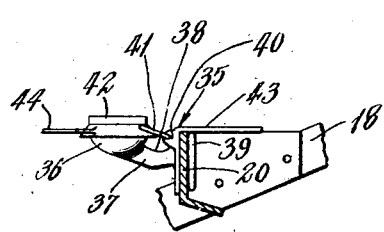
Inventor
John F. Mahlstedt
By Lyon & Lyon
Attorneys June 17, 1930.   J. F. MAHLSTEDT   1,764,802
EGG INSPECTION APPARATUS
Filed Aug. 21. 1928   2 Sheets-Sheet 2
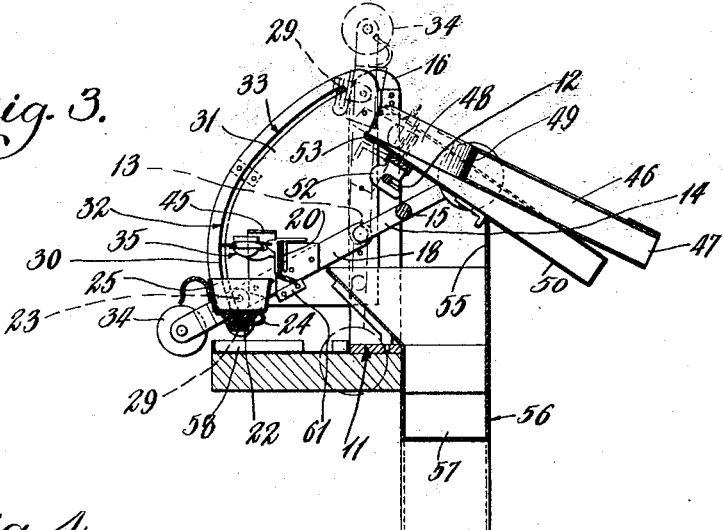
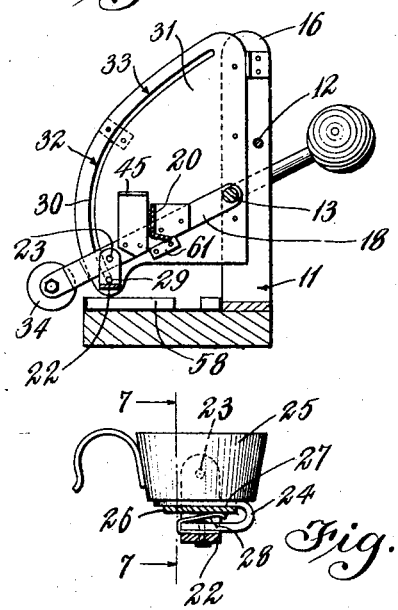
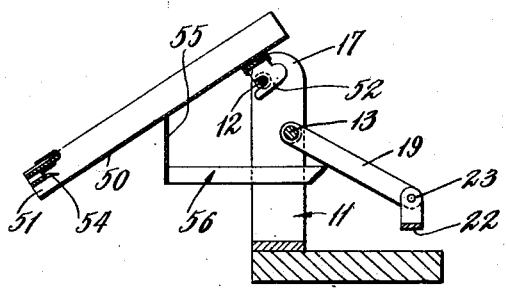
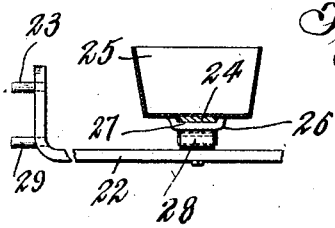
Inventor
John F. Mahlstedt
By Lyon & Lyon
Attorneys Patented June 17, 1930

1,764,802

UNITED STATES PATENT OFFICE

JOHN F. MAHLSTEDT, OF LOS ANGELES, CALIFORNIA

EGG-INSPECTION APPARATUS

Application filed August 21, 1928. Serial No. 301,049.

This invention relates to egg inspection apparatus which functions to receive the eggs when broken out of their shells. The invention also relates in some of its aspects to apparatus for separating the whites of the eggs from the yolks.

When eggs are employed in large numbers as, for example, in the bakery business, the eggs are measured by weight instead of by count, and a large business has developed in furnishing broken eggs to bakeries and other concerns using them. Heretofore there has been no apparatus that suitably takes care of the different parts of the eggs when broken by the operator.

Under the present method of breaking eggs, there is employed a small device for aiding in separating the whites from the yolks, but beyond this there is nothing to facilitate the various operations that are necessary for properly inspecting the whole eggs or the separated yolks and the whites. Accordingly, an important object of the present invention is the saving of time in the breaking, separating and inspecting of the eggs.

Another object is simplicity of construction and low cost of manufacture.

Another object is the ease with which the apparatus may be cleaned.

Another object is to facilitate the act of smelling the eggs by the operator, so as to determine whether or not the same are stale or musty.

Other objects and advantages will appear in the subjoined detailed description.

The accompanying drawings illustrate the invention.

Figure 1 is a plan view of an egg separator constructed in accordance with the provisions of this invention, the egg cups being shown in their lowered positions.

Figure 2 is a front elevation of Figure 1, showing the rear of the apparatus.

Figures 3, 4 and 5 are vertical sections on the lines indicated by 3—3, 4—4, 5—5 of Figure 1.

Figure 6 is an enlarged fragmentary vertical detail of the cup support partly in section, on the line indicated by 6—6, Figure 1, one of the egg cups being shown in elevation on said support.

Figure 7 is a view, mainly in vertical section, on the line indicated by 7—7, Figure 6.

Figure 8 is an enlarged side elevation of the device for aiding in separation of the white and yolk of the egg, the support on which said device is mounted being shown in section.

There is provided a U-shaped frame 11, which is adapted to rest on a table or other suitable support, not shown. A rod 12 connects the flanges of the U-shaped frame together, said rod being approximately horizontal. Below the level of the rod 12 and mounted in the flanges or standards of the frame is a rock-shaft 13, said shaft having two bends 14 therein, so as to cause a portion 15 of the shaft to be positioned eccentric to the turning axis of said shaft.

Near its ends and just inside of the standards 16, 17 of the support, the shaft 13 is provided with arms 18, 19, and mounted approximately midway of the length of said arms and connecting the same, is a shell-breaker bar 20 provided at intervals along its upper edge with sharpened edges 21.

The arms 18, 19 extend forwardly from the shaft, and carried near the outer ends of said arms is a cup-support which comprises a U-shaped member 22 that is pivoted at 23 at its opposite ends to the arms 18, 19, so that the member 22 can rock relative to the arms. The cup-support also comprises a number of cup-supporting clips 24 which are spaced at intervals along the member 22.

A number of egg cups 25 are provided, and the bottom of each cup is provided with a U-shaped member 26 secured to said bottom so as to form a slot 27 adapted to receive the upper leg of the clip 24. Thus the cups are detachably mounted on the support and they are attached and detached by sliding them on and off of the clips 24. In order to hold the cups on the clips so that they do not too readily slide off of said clips, each clip is provided with a spring 28 which is clamped between the member 22 and the lower leg of the clip 24 and extends rearwardly and upwardly so as to engage the bottom face of the member 26 of the cup engaging said clip. There is sufficient pressure of the springs 28 against the members 26 so as to retain the cups against any looseness, thus preventing the cups from accidentally sliding off the clips.

In the operation of the apparatus, it is intended that the cups be maintained in a horizontal position while being raised to a predetermined height and that thereafter the cups will be tilted so as to discharge therefrom their contents. For this purpose, one end of the member 22 is provided on its outer face with an outwardly projecting follower in the form of a pin 29 which engages in a cam groove 30 that is formed in a cam plate 31 secured to the standard 16, said cam plate projecting forwardly from said standard. The cam groove 30 comprises an arcuate portion 32 and a slightly curved or an approximately straight portion 33. When the arms 18, 19 are swung upwardly from their lowered position, the follower 29 traverses the groove portion 32 and the curve is such that the cups are maintained in horizontal position. As the arms are swung still further upwardly so as to cause the follower 29 to traverse the groove portion 33, the groove portion 33 forces the follower outwardly and upwardly with respect to the turning axis of the shaft, thus to tilt the member 22 and, consequently, all of the cups that are mounted thereon, the tilting being from front to rear. The arm 18 is provided at its outer end with a knob 34 whereby the cup carrier may be readily operated, said carrier comprising the hereinbefore described shaft 13, arms 18, 19, member 22 and clips 24.

Mounted to slide along the bar 20 is a device indicated in general by the character 35, said device being for the purpose of aiding in the separation of the yolk and white of the egg. The device 35 is constructed as follows: The device 35 comprises a yolk cup 36 supported on the end of an arm 37, the upper edge of which has a cutting edge 38. The arm 37 is carried by a slide 39 which is U-shaped so as to embrace the bar 20, thus permitting the cup 36 to be tilted sideways by rocking the slide 39 lengthwise of the bar 20. Pivoted at 40 to the slide 39 are arms 41 which carry a ring 42 adapted to fit the rim of the cup 36 when said ring is lowered. When the ring is raised it rests upon a shelf 43 that projects from the slide 39. The ring 42 is provided with an outstanding lip 44 for engagement by a finger of the operator for raising and lowering of the ring.

The device 35 may be tilted on the bar 20 without the necessity of detaching said device from said bar, so that the yolk of an egg deposited in the cup 36 can be ejected into one of the cups 25.

The device 35 may be of any suitable construction and the one illustrated and described above is already familiar to those skilled in this art, but it has been described herein, as such device constitutes one of the necessary units of the apparatus, when the apparatus is used for separating the whites and yolks.

The device 35 projects forwardly from the bar 20 so that the cup 36 can be brought over any one of the cups 25 by simply sliding the cup 36 along the bar 20. When the device 35 is slid to the extreme right end of the bar 20, in Figures 1 and 2, said device comes beneath a guard 45 which is secured to the arm 18, said guard preventing the ring 42 from swinging upwardly from the cup 36, when the shaft 13 is rotated to raise and tilt the cups.

When the cups 25 have been elevated by actuation of the shaft 13, to their extreme upper position and the axes of said cups are approximately horizontal, the rims of said cups project rearwardly over the front edge of a chute 46 which is provided at its rear end with an opening 47 for discharge of that portion of the egg that is emptied from the cups in the said chute. The forward portion of the chute 46 is provided with an opening, or openings, 48, in this instance two, each provided with an upstanding wall 49 so as to prevent the egg part emptied into the chute 46 from passing through said openings. The openings 48 are over a second chute 50 which is provided with a rear opening 51.

The mounting of the chutes 46, 50 is effected, in this instance, by providing downwardly projecting hooks 52 on the bottom of the chute 50 to engage over the bar 12, and the forward edge of the chute 46 is provided with hooks 53 that hook over the forward edge of the chute 50.

It may be assumed, for example, that the whites of the eggs are to be deposited in the chute 46 and the yolks in the chute 50. To make sure that the yolks are broken, I provide a yolk-breaker in the form of a serrated blade 54, mounted lengthwise in the opening 51 so as to partially obstruct said opening.

The lower chute 50 rests on the rear wall 55 of a third chute which is indicated in general by the character 56. Thus the chute 56 is mainly beneath the chute 50 and extends from end to end of the frame and but a slight distance rearwardly of the bar 20 when said bar is in its lowered position. The chute 56 is intended to receive the egg shells and it is provided with an opening 57 which discharges laterally to one end of the apparatus.

The construction described above operates as follows, it being assumed at the beginning that the cups 25 are in their lowered position. The operator slides the device 35 into position over the first cup on the right and raises the ring 42. She then strikes an egg on the nearest cutting edge 21 of the bar 20 or otherwise breaks the shell of the egg, and drops the contents of the shell in the cup 36, and throws the shell into the chute 56. The yolk of the egg remains in the cup 36 and the white discharges over the rim thereof and is aided in separation from the yolk, or cut off from the same, by the operator dropping the ring 42 onto the rim of the cup 36. This dropping of the ring is momentary, the ring being immediately raised by the operator, whereupon the operator tilts the cup 36 to pitch or throw the yolk of the egg into the second cup 25.

In practice, it is customary to deposit the whites of two eggs in one cup and the yolks thereof in the next cup and, accordingly, the operations just mentioned for breaking the second egg and separating the yolk and white will be repeated over the first and second cups. Then the operator slides the device 35 to the third cup from the left and the operations hereinabove described will be repeated until half the cups have been provided with egg whites and the other half with egg yolks.

As the operator breaks the eggs, she inspects them visually for signs of deterioration as, for example, blood spots and cloudiness, and when one has been broken that shows either of these defects, the cup receiving the contents is immediately removed for emptying and sterilization and another sterilized cup substituted therefor on the carrier.

Assuming that the cups now contain whites and yolks of three or six eggs, that have passed visual inspection, the operator then slides the device 35 beneath the guard 45 and turns the shaft 13 to raise the cups to as high a position as possible without tilting the same. This position of the cups brings them to about the right level for smelling of the contents of the cups by the operator, who smells of the broken eggs from left to right or from right to left and, if this test reveals that the contents of any of the cups are spoiled, the cup containing the spoiled eggs will be removed from the carrier for emptying and sterilization.

After the smelling test is completed, the operator turns the shaft 13 still further so as to cause the cups to swing upwardly and tilt, thus discharging their contents in the appropriate chutes, whites of the eggs being in the first, third and fifth cups will discharge, in this instance, into the chute 46, and the yolks being in the second, fourth and sixth cups will discharge into the chute 50, and the whites and yolks will discharge from the respective chutes into suitable receptacles, not shown, placed beneath the discharge openings of said chutes.

After the cups have been emptied, they will be lowered to their lowermost position and the operations above described will be repeated.

Not only are the whites and yolks of eggs sold separately in bulk, but there is approximately an equally large market to be supplied with broken whole eggs or, in other words, eggs from which the shells have been removed but of which the whites and yolks are not separated and, accordingly, remain together.

To employ the apparatus for inspecting broken whole eggs, the device 35 will be removed from the bar 20 by simply lifting the member 39 off of said bar and the upper chute 46 will be removed by detaching it from the rod 12. The egg shells will be broken as above described, and both white and yolk of the individual eggs will be placed in the same cup 25, preferably two eggs in each cup. The visual and smell tests will be applied as above described and the contents of the cups will be emptied into the cute 50.

It is preferable to provide a drip pan 58 beneath the cups 25 and bar 20 to receive the egg drippings when the egg shells are being broken and the eggs are being moved from said bar 20 to position over the cup 36. This pan 58 is mounted aslant in the frame and a receptacle 59 is positioned beneath the lower end of said pan to receive the drippings discharging therefrom. The receptacle is connected with the frame 11 by a bracket 60.

When the shaft 13 is in lowered position, the arm 18 rests upon a stop 61, though, if it were omitted, the follower 29 would engage the lower end wall of the groove 32.

I claim:

1. An egg inspection apparatus comprising a frame, a cup carrier tiltably connected with the frame, cups detachably mounted on the carrier, a white and yolk separating device movably mounted on the carrier and selectively positionable over said cups, and a chute positioned to receive the contents of the cups when said cups are tilted.

2. An egg inspection apparatus comprising a frame, a cup carrier, a means to elevate and tilt the cup carrier, cups detachably mounted on the carrier, a white and yolk separating device movably mounted on the carrier and selectively positionable over said cups, and a chute positioned to receive the contents of the cups when said cups are tilted.

3. An egg inspection apparatus comprising a frame, a cup carrier tiltably connected with the frame, cups detachably mounted on the carrier, and chutes mounted one above the other in position to receive the contents of the cups when said cups are tilted, there being an opening in the upper chute in alignment with one of the cups to permit of the discharge of the contents of said cups through said openings into the lower chute.

4. An egg inspection apparatus comprising a frame, a cup carrier, a means to elevate and tilt the cup carrier, cups detachably mounted on said carrier, and chutes positioned one above the other in position to receive the contents of the cups when said cups are tilted, the upper chute provided with an opening in alignment with one of the cups to permit of the discharge of the contents of said cups through said openings into the lower chute.

5. An egg inspection apparatus comprising a frame, a shaft mounted to rock in said frame, arms fixed to said shaft, a bar mounted to rock on said arms and provided with a follower, a cam plate provided with a slot in which the follower rides when the shaft is turned, said slot having an arcuate portion and an approximately straight portion, and cups detachably mounted on the bar.

6. An egg inspection apparatus comprising a frame, a cup carrier tiltably connected with the frame, cups detachably mounted on the carrier, a bar mounted on the carrier, and a white and yolk separating device slidably mounted on said bar and selectively positionable over the cups.

7. An egg inspection apparatus comprising a frame, a cup carrier, a means to elevate and tilt said carrier, cups detachably mounted on said carrier, a bar mounted on the carrier, and a white and yolk separating device slidably mounted on said bar and selectively positionable over the cups.

8. An egg inspection apparatus comprising a frame, a cup carrier movably connected to said frame, cups detachably mounted on the carrier, and springs mounted between the carrier and the cups yieldingly retaining the cups on the carrier.

9. An egg inspection apparatus comprising a frame, a cup carrier tiltably mounted on the frame, a bar secured to the carrier, cups detachably mounted on the carrier, a white and yolk separating device slidably mounted on the bar and selectively positionable over the cups, a chute mounted on the frame in position to receive the contents of alternate cups when said cups are in tilted position, said chute provided with openings therethrough aligned with the other cups, and the second chute positioned beneath the first chute to receive the contents of said other cups when they are tilted.

10. An egg inspection apparatus comprising a frame, a cup carrier tiltably connected with the frame, cups detachably mounted on the carrier, and a white and yolk separating device movably connected with the carrier and selectively positionable over said cups.

11. An egg inspection apparatus comprising a frame, a cup carrier, a means connected with the frame to elevate and tilt the cup carrier, cups detachably mounted on the carrier, and a white and yolk separating device movably connected with the carrier and selectively positionable over said cups.

12. An egg inspection apparatus comprising a frame, a bar rockably connected with the frame, a means connected with the frame and with the bar to raise said bar, means on the bar and frame cooperating to maintain the bar against rocking while said bar is being moved a predetermined distance, and to effect rocking of the bar when said bar is further moved, and cups detachably mounted on the bar.

13. An egg inspection apparatus comprising a frame, a cup carrier tiltably connected with the frame, cups detachably mounted on the carrier, a bar mounted on the carrier, a guard on the frame extending over one end of the bar, and a white and yolk separating device slidably mounted on said bar and selectively positionable over the cups and to position beneath said guard.

14. An egg inspection apparatus comprising a frame, a cup carrier tiltably mounted on the frame, a bar secured to the carrier, cups detachably mounted on the carrier, a white and yolk separating device detachably and slidably mounted on the bar and selectively positionable over the cups, a chute fastened to the frame in position to lie beneath the cups when the cups are tilted, and a second chute removably mounted on the frame above the first chute and provided with openings therethrough aligned with some of the cups, to permit of the discharge of the contents of said cups through said openings into the lower chute.

Signed at Los Angeles, California, this 14th day of August, 1928.

JOHN F. MAHLSTEDT.